(12) United States Patent
Ranade (10) Patent No.: US 9,015,430 B2
(45) Date of Patent: Apr. 21, 2015

(54) COPY ON WRITE STORAGE CONSERVATION SYSTEMS AND METHODS

(75) Inventor: Dilip Madhusudan Ranade, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 1150 days.

(21) Appl. No.: 12/716,201

(22) Filed: Mar. 2, 2010

(65) Prior Publication Data

US 2011/0219201 A1    Sep. 8, 2011

(51) Int. Cl.
*G06F 12/16* (2006.01)
*G06F 12/00* (2006.01)
*G06F 17/30* (2006.01)

(52) U.S. Cl.
CPC .... *G06F 17/30088* (2013.01); *G06F 17/30138* (2013.01); *Y10S 707/99955* (2013.01)

(58) Field of Classification Search
CPC ............ G06F 11/1448; G06F 11/1446; G06F 11/1461; G06F 11/3055; G06F 3/0604; G06F 3/0641; G06F 3/065; G06F 3/0652; G06F 3/0608; G06F 17/30088; G06F 2201/84
USPC .......... 711/162, E12.103, 171; 707/649, 639, 707/657, 999.204
See application file for complete search history.

(56) References Cited

U.S. PATENT DOCUMENTS

| | | | |
|---|---|---|---|
| 6,052,692 A * | 4/2000 | Anderson et al. ..................... | 1/1 |
| 6,584,585 B1 * | 6/2003 | Patterson, Jr. .................. | 714/44 |
| 6,694,413 B1 * | 2/2004 | Mimatsu et al. ............... | 711/162 |
| 6,971,018 B1 * | 11/2005 | Witt et al. ...................... | 713/187 |
| 7,631,224 B2 * | 12/2009 | Oguma .............................. | 714/37 |
| 8,046,547 B1 * | 10/2011 | Chatterjee et al. ............ | 711/162 |
| 8,117,409 B2 * | 2/2012 | Kaneda et al. ................ | 711/162 |
| 8,375,181 B1 * | 2/2013 | Kekre et al. ................... | 711/162 |
| 2002/0103980 A1 * | 8/2002 | Crockett et al. .............. | 711/162 |
| 2005/0097294 A1 * | 5/2005 | Hepkin ......................... | 711/170 |
| 2005/0182890 A1 * | 8/2005 | Yamagami ......................... | 711/4 |
| 2007/0150689 A1 * | 6/2007 | Pandit et al. .................. | 711/170 |
| 2007/0198605 A1 * | 8/2007 | Saika ............................. | 707/202 |
| 2009/0055607 A1 * | 2/2009 | Schack et al. ................. | 711/162 |
| 2009/0055608 A1 * | 2/2009 | Yamasaki ..................... | 711/162 |
| 2009/0182959 A1 * | 7/2009 | Rao ................................ | 711/159 |
| 2009/0204650 A1 * | 8/2009 | Wong et al. ................... | 707/204 |
| 2009/0327628 A1 * | 12/2009 | Narayanan et al. ........... | 711/162 |
| 2010/0011178 A1 * | 1/2010 | Feathergill .................... | 711/162 |
| 2010/0077165 A1 * | 3/2010 | Lu et al. ........................ | 711/162 |
| 2010/0082896 A1 * | 4/2010 | Orikasa et al. ................ | 711/111 |

* cited by examiner

*Primary Examiner* — Yong Choe
*Assistant Examiner* — Edward Waddy, Jr.
(74) *Attorney, Agent, or Firm* — Wilmer Cutler Pickering Hale and Dorr LLP (57) ABSTRACT

Systems and methods for copy on write storage conservation are presented. In one embodiment a copy on write storage conservation method includes creating and mounting a snapshot; mounting a snapshot; monitoring interest in the snapshot; initiating a copy on write discard process before a backup or replication is complete; and deleting the snapshot when the backup or replication is complete. In one embodiment the method also includes marking a file as do not copy on write. In one embodiment, the copy on write discard process includes discarding copy on write data when a corresponding read on the file in the snapshot is successful. Initiating a copy on write discard process can be done at a variety of levels (e.g., a file level, an extent level, a block-level, etc.).

20 Claims, 11 Drawing Sheets

110
Creating and mounting a snapshot.

120
Monitoring interest in a snapshot.

130
Initiating a copy on write discard process before a backup is complete.

140
Marking a file as do not copy on write.

150
Unmounting and Deleting the snapshot.

801
Copy on write storage conservation module.

810
Copy on write data storage monitoring module.

820
Copy on write data consumer application interest analysis module.

830
Aggressive copy on write data deletion module.

FIGURE 8

901
Copy on write storage conservation module.

910
Snapshot creation module.

920
Snapshot mounting module.

930
Snapshot interest monitoring module.

940
Copy on write discard module.

950
Do not copy on write marking module.

960
Snapshot un-mounting module.

970
Snapshot deletion module.

COPY ON WRITE STORAGE CONSERVATION SYSTEMS AND METHODS

FIELD OF THE INVENTION

The present embodiments relate to the field of information storage replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining accurate replicated backup storage of the information is often very important for a variety or reasons (e.g., disaster recovery, corruption correction, etc.).

Accurately duplicating the information in a consistent manner is typically very important. Some traditional backup and replication approaches utilize snapshots or checkpoints in an attempt to allow Applications to continue to write to the primary file system while a backup or replication is in progress without burdening the application making use of that file system. The storage checkpoints or file system snapshots are often utilized for ensuring a backup and replication is taken of an image at a consistent point in time. Depending upon the amount of data to be processed from the snapshot, the lifetime of the snapshot can be quite long, especially if the backup/replication application requires a persistent snapshot during the entire backup/replication process. Some conventional approaches utilize copy on write (COW) mechanisms as part of the snapshot operations. The COW is typically used to preserve earlier data of a file that is overwritten and there can be COW overhead for the lifetime of the snapshot, even for those blocks that have already been read by a consumer or backup or replication application.

Conventional approaches typically require the entire backup or replication to be complete before snapshot information can be discarded. However, as more and more changes come in, more and more storage is consumed for preserving the snapshot image. If the backup or replication cannot finish before the system runs out of free space, the snapshot is discarded prematurely and backup or replication fails. For systems with limited free space, backup or replication may never complete successfully. Some conventional approaches may attempt to add significant amounts of storage capacity to enable free space to be available, however this approach can be very resource intensive and costly or infeasible.

SUMMARY

Systems and methods for copy on write storage conservation are presented. In one embodiment a copy on write storage conservation method includes creating and mounting a snapshot; mounting a snapshot; monitoring interest in the snapshot; initiating a copy on write discard process before a backup or replication is complete; and deleting the snapshot when the backup or replication is complete. In one embodiment the method also includes marking a file as do not copy on write. In one embodiment, the copy on write discard process includes discarding copy on write data when a corresponding read on the file is successful. In one exemplary implementation the copy on write discard process includes a signal to delete copy on write blocks and the signal is a close( ) function of the file indicating reads of information from the file are finished. The copy on write discard process can include determining backup or replication applications that read file data in peculiar patterns; and discarding the copy on write data for a particular file when it is safe in accordance with the peculiar pattern. Initiating a copy on write discard process can be done at a variety of levels (e.g., a file level, an extent level, a block-level, etc.). In one embodiment, a public application program interface is available to set the snapshot in an aggressive de-allocation mode initiated before the completion of the backup or replication.

In one embodiment a computer readable storage medium has stored thereon, computer-executable instructions that when executed by a computing device cause the computing device to perform a copy on write storage conservation method. In one embodiment a system is utilized to perform a copy on write storage conservation method. The system can include a computer system having a processor coupled to a computer readable storage media and executing computer readable code which causes the computer system to perform a copy on write storage conservation method.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective memory backup and replication operations including copy on write storage conservation. Present storage systems and methods minimize resource occupation and time expenditure of time associated with backup or replication operations. The present systems and methods facilitate automated aggressive recovery of copy on write storage before completion of backup or replication operations. The copy on write date deletion or discard operations can be directed at data that has not changed since the beginning of the backup or replication and also data that has changed since the beginning of the backup or replication process. Backups and replication are important use cases for snapshots and present systems and methods can facilitate improvements that decrease the consumption of storage space in backup snapshot scenarios. Present systems and methods can be implemented with zero or minor changes in a backup or replication application. It is also appreciated that present systems and methods can apply to a file system in general.

Figure 1:
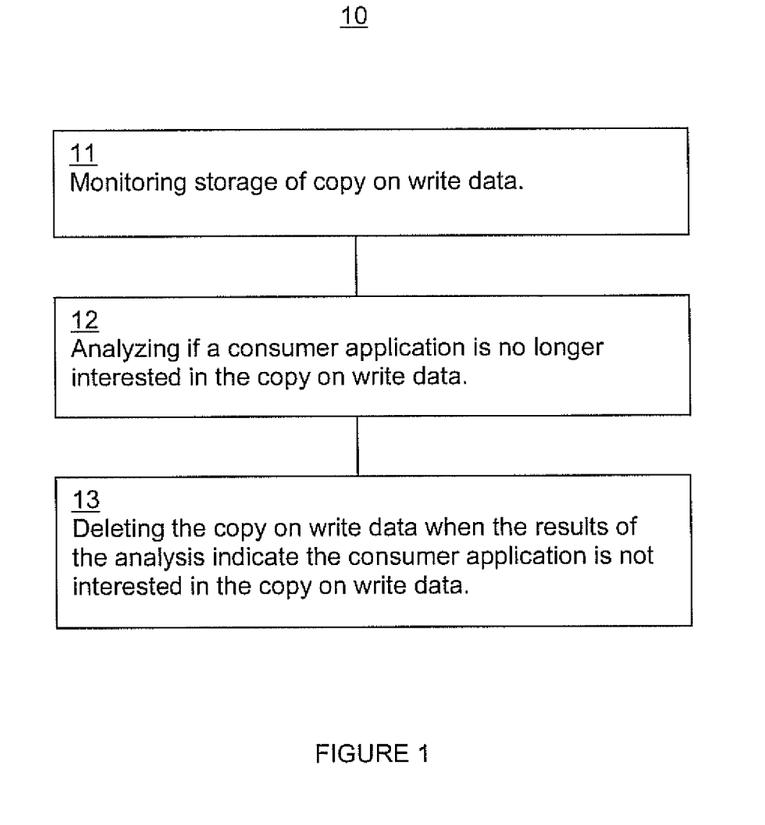
FIG. 1 is a block diagram of an exemplary copy on write storage conservation method in accordance with one embodiment of the present invention.

FIG. 1 is a block diagram of copy on write storage conservation method 10 in accordance with one embodiment of the present invention. In one embodiment, write storage conservation method 10 facilitates timely reclaiming of storage space associated with copy on write data. In one exemplary implementation, the copy on write data is associated with backup or replication snapshot or checkpoint operations.

In block 11, storage of copy on write data is monitored. In one embodiment, the location of copy on write data is monitored.

In block 12, an analysis is made to determine if a consumer application is no longer interested in the copy on write data. In one embodiment, the analysis includes examining whether the copy on write data has been read before by a consumer application (e.g., a backup operation, replication operation, etc.).

In block 13, the copy on write data is deleted when the results of the analysis indicate the consumer application is not interested in the copy on write data. In one embodiment, the copy on write data is deleted when the consumer application has read the copy on write data.

It is appreciated that a variety of mechanisms for activating present systems and methods are readily implemented. In on embodiment, a public application program interface is available to facilitate setting the snapshot in an aggressive de-allocation mode initiated before the completion of the backup or replication. In one exemplary implementation, an aggressive de-allocation mode can be automatically triggered in response to various scenarios (e.g., in response to an application initiation or condition, in response to a low available storage space indication, etc.).

Figure 2:
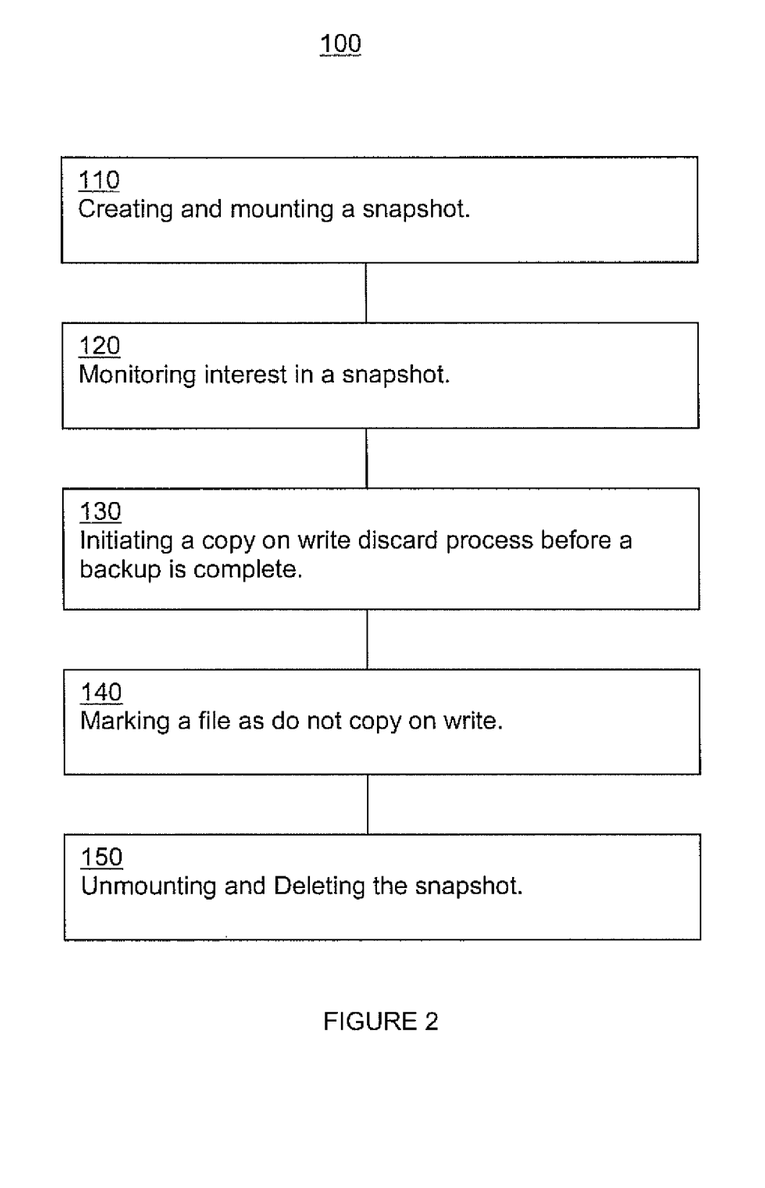
FIG. 2 is a block diagram of an exemplary copy on write storage conservation method in accordance with one embodiment of the present invention.

FIG. 2 is a block diagram of copy on write storage conservation method 100 in accordance with one embodiment of the present invention. In one embodiment the method involves reclaiming copy on write storage space before a backup or replication is complete. In one embodiment in which storage checkpoints are used when backing up or replicating data, the copy on write storage conservation method essentially converts "data full" storage checkpoints to "no data" storage checkpoints aggressively as the backup or replication runs. Features of copy on write storage conservation method 100 can be applied for a file system level snapshot.

In block 110, a snapshot is created and mounted. In one embodiment creating and mounting a snapshot is preformed in a conventional manner. In one exemplary implementation, the snapshot, including associated copy on write data, is essentially a copy of the data set corresponding to a point in time that can be utilized by a system to perform the replication or backup while allowing applications to continue writing to their data with minimal or no down time.

In block 120, interest in snapshot information is monitored. In one embodiment, whether a consumer application (e.g., backup application, replication application, etc.) has read or not read snapshot information including copy on write data is monitored. In one exemplary implementation, if a backup or replication application has read the copy on write data an extrapolation is made that the backup or replication application is no longer interested in the copy on write data.

It is appreciated that the present systems and methods can be readily adapted to facilitate a variety of implementations and scenarios in which the backup or replication reads the same block more than once. In one embodiment, a signal to delete COW blocks may be taken to be a close( ) function of the file indicating reads (e.g., backup related reads, replication related reads, etc.) of information from the file are finished or when the full file has been read. This approach facilitates accurate deletion of backup or replication storage space even if backup or replication applications read a file more than once but open and close it exactly once.

In one embodiment, peculiar patterns associated with a backup or replication are analyzed and the results utilized in snapshot storage reclamation operations. In one exemplary implementation, a determination is made if backup or replication applications read file data in peculiar patterns. If there is a peculiar pattern, the COW data for a particular file is discarded when it is safe in accordance with the peculiar pattern. The backup or replication application can signal the snapshot as to when it is safe to discard the COW data for a particular file. The signal can be some system call overloaded for this purpose (e.g., a truncate, unlink, ioctl, etc.).

In block 130, a discard process initiated before the backup or replication process is complete. It is appreciated the discard process can be implemented in a variety of approaches. In one embodiment, as the backup or replication application reads a file block, the snapshot deletes or discards COW data associated with the block after a corresponding read on the block is successful. The deletion of the copy on write data is initiated before completion of the backup or replication. In one exemplary implementation, the initiation of the deletion does not wait for the backup or replication application to finish reading all blocks in all files. In one embodiment, the snapshot can continue to treat a block associated with deleted copy on write data as already snapshotted so that fresh writes associated with a primary resource do not generate a COW again. It is appreciated that a present copy on write discard process can be done at a variety of levels (e.g., a file level, an extent level, a block-level, etc.).

In block 140, a file is marked as do not copy on write. In one embodiment, when a backup or replication application finishes reading a file, it is marked as "do not COW" so that no storage is consumed for writes to this file generating COW blocks. Such marking can be done at file, extent, or block level.

In block 150, a snapshot can be unmounted and remaining snapshot information can be deleted when the backup or replication is complete. In one embodiment, a backup or replication is finished or complete when all file blocks from all files associated with the backup or replication have been read by the backup or replication application. In one exemplary implementation, deleting remaining snapshot information when the backup or replication is complete can include deleting all information associated with a snapshot including the snapshot itself.

Figure 3:
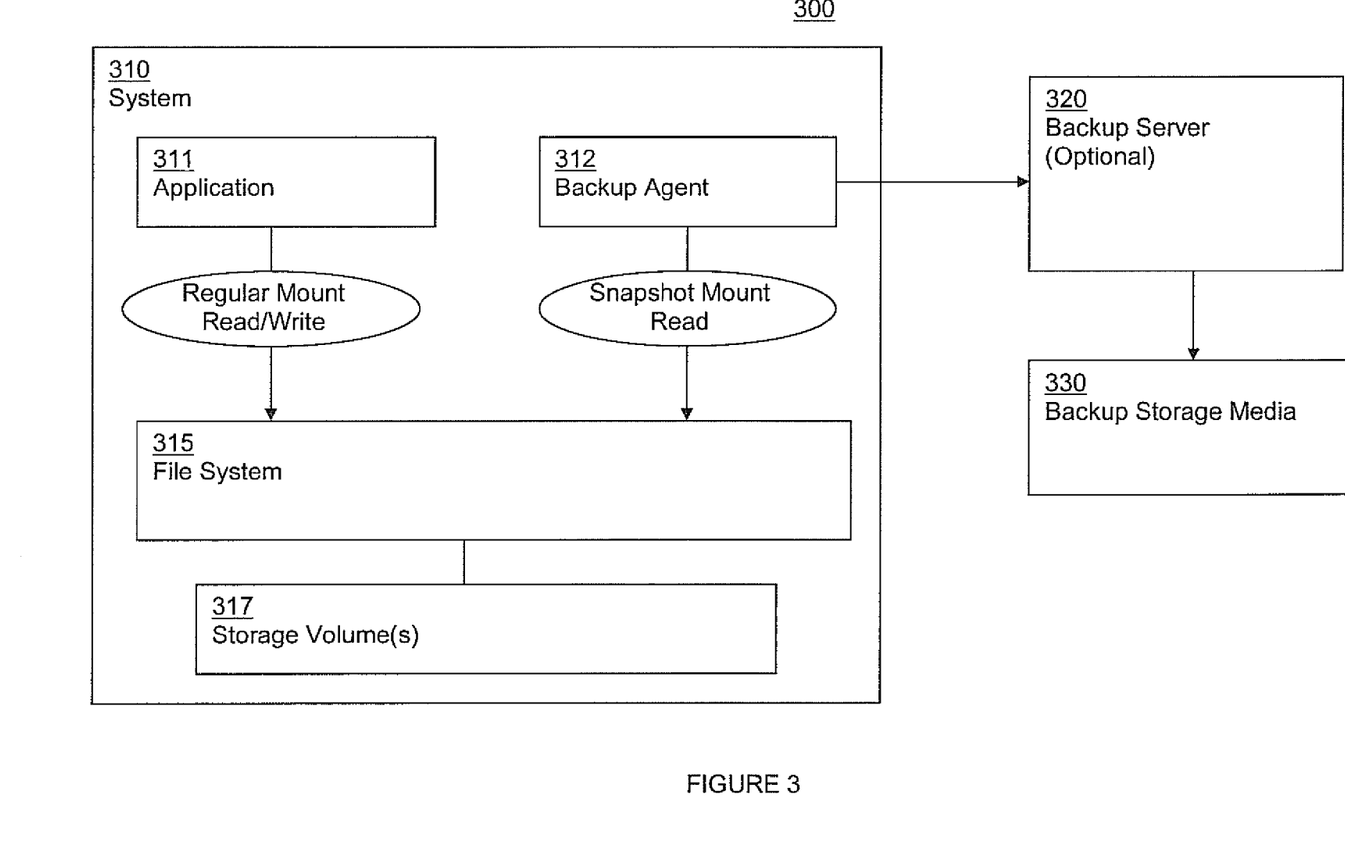
FIG. 3 is an exemplary backup environment in accordance with one embodiment of the present invention.

FIG. 3 is an exemplary backup environment 300 in accordance with one embodiment of the present invention. Backup environment 300 includes computer system 310, optional backup server 320, and backup storage media 330. Computer system 310 includes application 311, backup agent 312, file system 315, and storage volume of 317. It is appreciated that storage volume 317 can include one or more volumes.

The components of backup environment 300 cooperatively operate to perform various functions associated with application 311 and backup of corresponding information. Application 311 runs on computer system 310 utilizing information from file system 315 and information on storage volume 317. Backup agent 312 can forward or "copy" file information across to the backup storage media 330 through optional backup server 320. In one embodiment where optional backup server 320 is not included in the architecture, the backup agent 312 can forward the file information directly to backup storage media 330.

In one embodiment, application 311 performs a regular mount of file system 315 and application 311 can read data from and write data to file system 315. In one embodiment, an operating system mounts file system 315 so that an application can access the files in the storage volume 317 for reads and writes. File system 315 facilitates coordination of information transfers between application 311 and storage volume 317. File system 315 also facilitates coordination of information transfers between backup agent 312 and storage volume 317. While the illustration in FIG. 3 includes directional indicators or arrows on the respective lines connecting file system 317 to application 311 and backup agent 312 and the arrows indicate application 311 and backup agent 312 respectively mount file system 317, it is appreciated that information can flow both directions between file system 315 and application 311 and backup agent 312. It is also appreciated information can also flow from backup server media 330 to backup server 320 and from backup server 320 to backup agent 312 (e.g., control related information, write confirmation indication, etc.). In one embodiment, file system 315 utilizes snapshots to coordinate accurate backup of the information in storage volume 317.

Once a snapshot is taken the snapshot can be mapped in a separate file system that is accessed as part of a snapshot mount. So the backup agent 312 does not really need the files to be available though the standard mount and they remain available to the application 311, rather the backup agent accesses the files through the snapshot mount. In one embodiment, the backup agent 312 can traverse the whole set of files from the file system 315 that are available through the snapshot mount read operations. File system 315 can also perform file level snapshot creation and management including copy on write storage conservation in accordance with one embodiment of the present invention.

Figure 4:
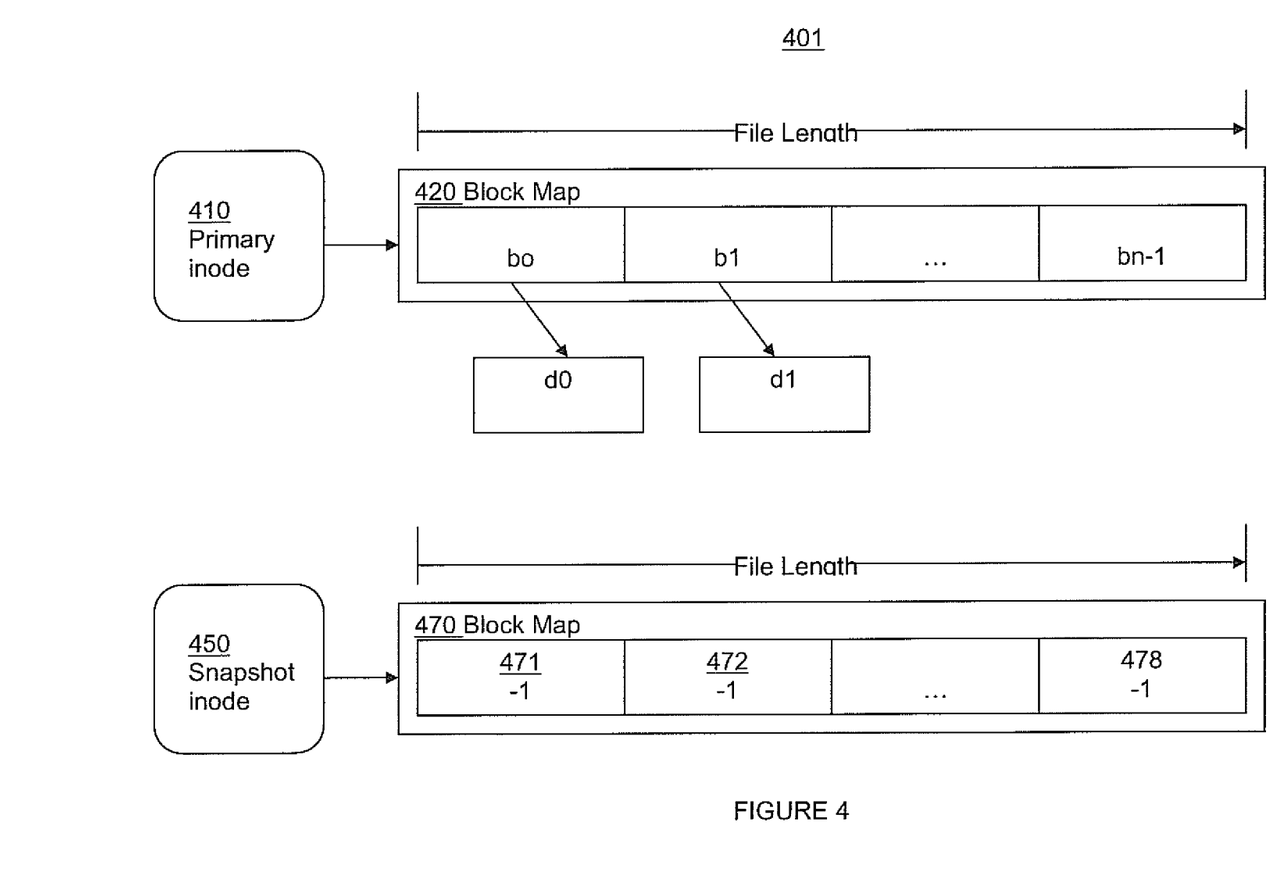
FIG. 4 is a block diagram of an exemplary file level snapshot creation at first time in accordance with one embodiment of the present invention.

FIG. 4 is a block diagram of an exemplary file level snapshot creation at time 401 in accordance with one embodiment of the present invention. FIG. 4 includes a primary inode 410 and its associated snapshot inode (aka clone inode) 450 immediately after a snapshot has been created or "taken". The primary inode's block map 420 includes block addresses (e.g., block number of the disk, etc.) b0, b1, . . . , bn−1. In the present implementation, at time 401 block b0 includes data d0 and block b1 includes the data d1. The blocks 471 through 478 of block map 470 (e.g., associated with snapshot inode 450) include a respective indicator (in the present implementation the indicator is "−1") that signifies that the data (e.g., d0, d1, etc.) is in the primary inode 410. The block maps shown are a logical abstraction. It is appreciated that present systems and methods can be implemented using trees (such as b-trees) or other data structures.

Figure 5:
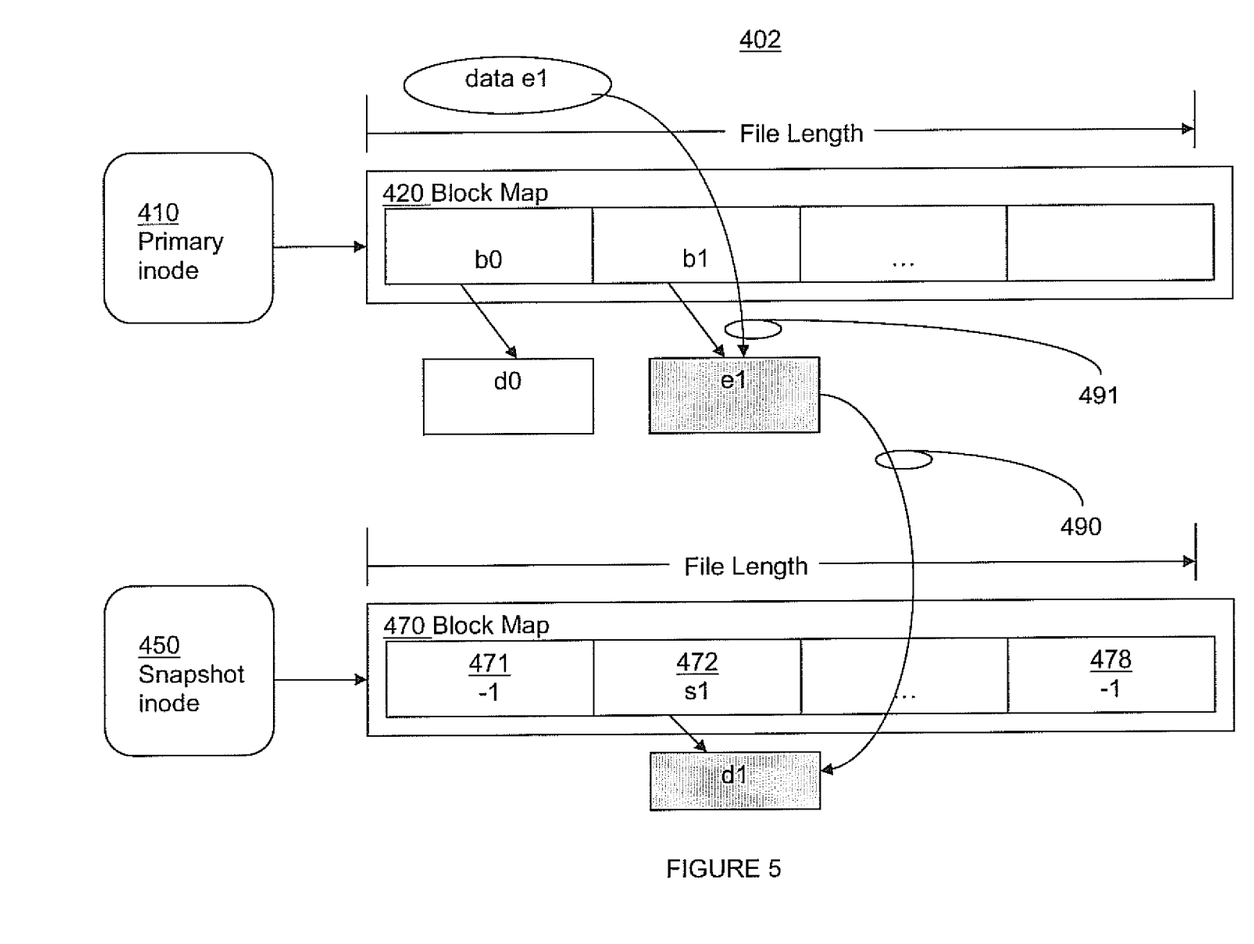
FIG. 5 is a block diagram of an exemplary result of a write to a file level snapshot at a second time in accordance with one embodiment of the present invention.

FIG. 5 is a block diagram of an exemplary result of a write to the file level snapshot at time 402 in accordance with one embodiment of the present invention. In one embodiment, the states illustrated in FIG. 5 are the result of a write by an application (e.g., application 311) to the second logical block b1 of the file after a snapshot is created or "taken". In one exemplary implementation, a backup agent (e.g., backup agent 312) begins a backup traversal of the primary inode but before the backup agent has read the second logical block an application writes to the second logical block b1. In one embodiment, essentially three I/Os are performed. In operations 490, a new block 472 "s1" is allocated to the snapshot inode 450 at offset 1, and then old data d1 is copied from block b1 of primary node 410 to snapshot node 450 block 472 "s1". The operations 490 (this is the copy-on-write and can considered two I/Os). In operation 491, the new data e1 is written to block b1.

Figure 6:
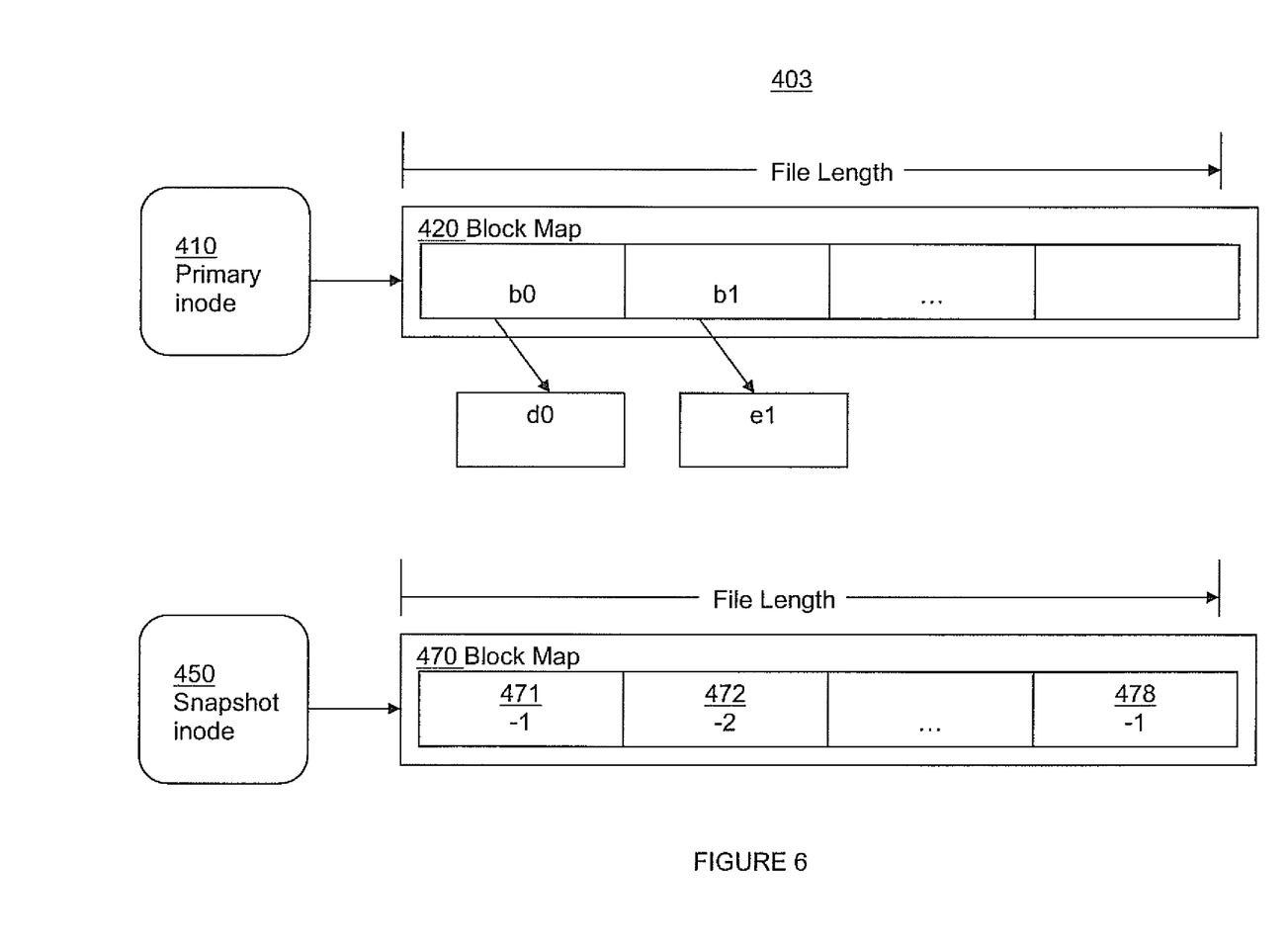
FIG. 6 is a block diagram of an exemplary copy on write storage conservation implementation at a third time in accordance with one embodiment of the present invention.

FIG. 6 is a block diagram of an exemplary copy on write storage conservation implementation at time 403 in accordance with one embodiment of the present invention. In one embodiment, the states illustrated in FIG. 6 are the result of copy on write storage conservation in which the data d1 from the second logical block 472 of the file is deleted after a backup application or agent has read the data d1 in the second logical block 472. In one exemplary implementation, an indicator is put in the block 472 (in the present implementation the indicator is "−2"). The indicator (e.g., "−2") can signify that the backup application or agent has read the block. After the deletion of the data d1 from block 472, the storage space that was utilized to store data d1 for the snapshot inode 450 can be freed up for additional use. In one embodiment, the copy on write deletion and conservation is performed on a file level and a single indictor or flag can be utilized for the entire file and each block is not individually tracked.

Figure 7:
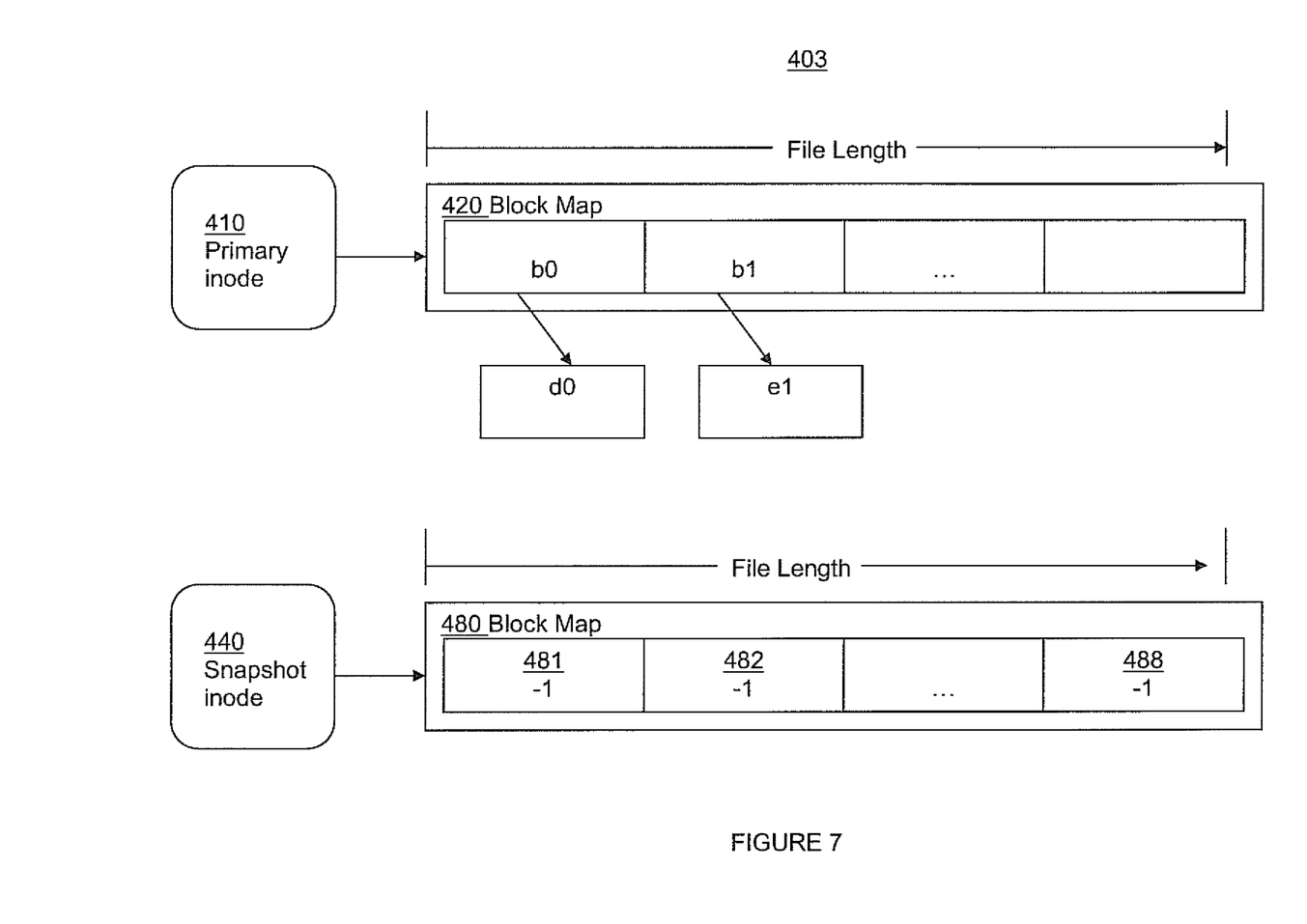
FIG. 7 is a block diagram of an exemplary copy on write storage conservation implementation at a forth time in accordance with one embodiment of the present invention.

FIG. 7 is a block diagram of an exemplary copy on write storage conservation implementation at time 404 in accordance with one embodiment of the present invention. In one embodiment, the states illustrated in FIG. 7 are the result of a backup application or agent finishing or completing backup of information associated with snapshot inode 450. It is appreciated that snapshot inode 450 can be deleted and the storage space can be utilized for the creation of snapshot 440.

In addition to COW-based snapshot approaches, it is appreciated the present systems and methods can be implemented in various implementations (e.g., ROW (Redirect on write) aka DOW (Divert on write), etc.). In one embodiment, the difference between a COW approach and a ROW approach includes block addresses that are switched between two inodes. For example, a new block s1 (similar to shown in FIG. 3B) would be allocated to primary Mode, replacing the value b1. Before that, however, value b1 would be preserved in the snapshot Mode, replacing the second "−1". The COW operates on the block addresses rather than on the blocks, as it were. Subsequently, data e1 is written to block s1. As is readily apparent, once the write completes, there is no difference how the data is arranged. For example, the new data can be with the primary Mode and the old data can be preserved in the snapshot Mode. Thus present systems and methods can work equally well in this case.

Figure 8:
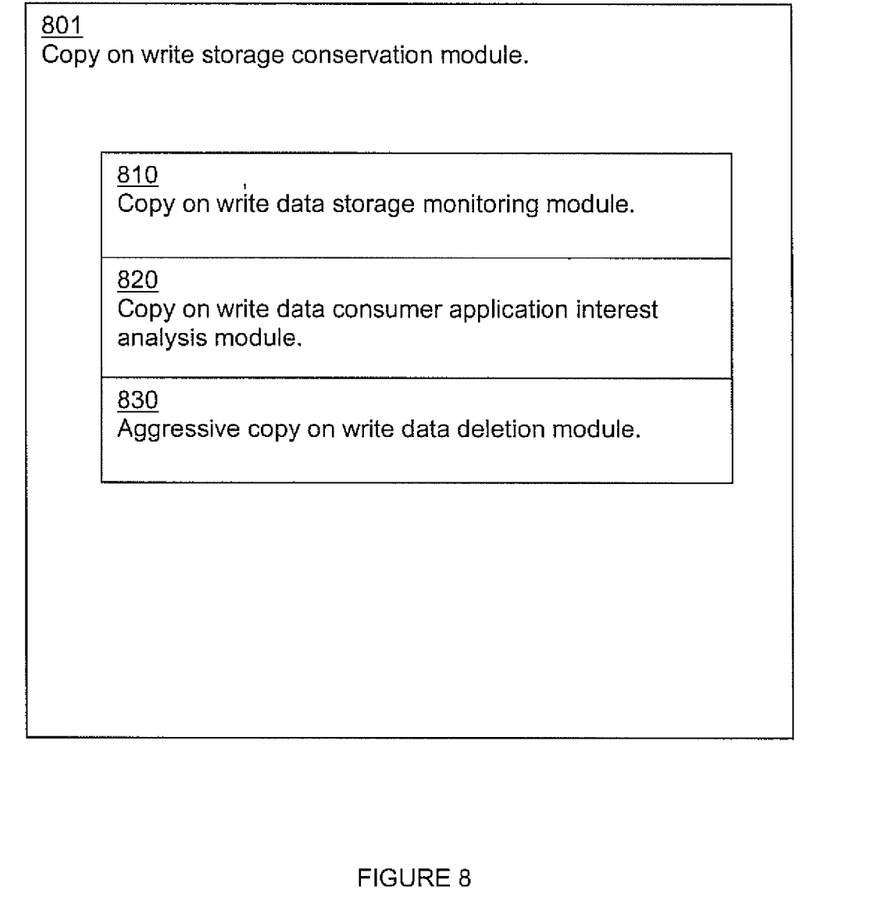
FIG. 8 is a block diagram of an exemplary copy on write storage conservation module in accordance with one embodiment of the present invention.

In one embodiment, a computer readable medium includes modules of instructions directed at performing copy on write storage conservation. FIG. 8 is a block diagram of copy on write storage conservation module 801 which includes instructions for directing a processor in performance of a copy on write storage conservation (e.g., copy on write storage conservation method 10, etc.). Copy on write storage conservation module 801 includes copy on write data storage monitoring module 810, copy on write data consumer application interest analysis module 820 and aggressive copy on write data deletion module 830. Copy on write data storage monitoring module 810 includes instructions for performing a copy on write data storage monitoring process. In one embodiment, copy on write data storage monitoring module 810 includes instructions for performing block 10. Copy on write data consumer application interest analysis module 820 includes instructions for performing a copy on write data consumer application interest analysis process. In one embodiment, copy on write data consumer application interest analysis module 820 includes instructions for performing block 20. Aggressive copy on write data deletion module 830 includes instructions for performing an aggressive copy on write data deletion process. In one embodiment, aggressive copy on write data deletion module 830 includes instructions for performing block 30.

Figure 9:
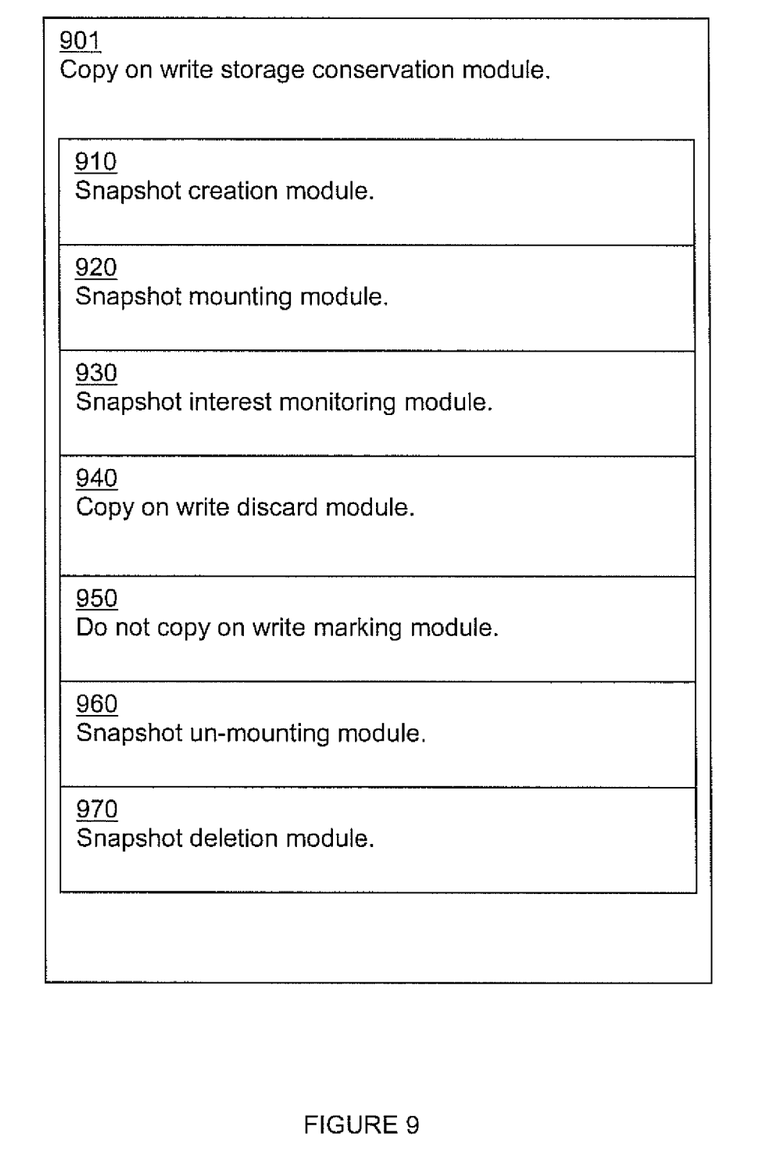
FIG. 9 is a block diagram of another exemplary copy on write storage conservation module in accordance with one embodiment of the present invention.

FIG. 9 is a block diagram of copy on write storage conservation module 901 which includes instructions for directing a processor in performance of a (e.g., copy on write storage conservation method 100, etc.). Copy on write storage conservation module 901 includes snapshot creation module 910, snapshot mounting module 920, snapshot interest monitoring module 930, copy on write discard module 940, do not copy on write marking module 950, and snapshot un-mounting module 960 and snapshot deletion module 970. Snapshot creation module 910 includes instructions for performing a snapshot creation method. In one embodiment, snapshot creation module 910 includes instructions for performing snapshot creation portions of block 110. Snapshot mounting module 920 includes instructions for performing a snapshot mounting method. In one embodiment, snapshot mounting module 920 includes instructions for performing mounting portions of block 110. Snapshot interest monitoring module 930 includes instructions for performing a snapshot interest monitoring method. In one embodiment, snapshot interest monitoring module 930 includes instructions for performing block 120. Copy on write discard module 940 includes instructions for performing a copy on write discard process. In one embodiment, copy on write discard module 940 includes instructions for performing block 130. Do not copy on write marking module 950 includes instructions for performing a do not copy on write marking process. In one embodiment, do not copy on write marking module 950 includes instructions for performing block 140. Snapshot un-mounting module 960 includes instructions for performing a snapshot un-mounting method. In one embodiment, snapshot un-mounting module 960 includes instructions for performing un-mounting portions of block 150. Snapshot deletion module 970 includes instructions for performing a snapshot deletion process. In one embodiment, snapshot deletion module 970 includes instructions for performing block 150.

Copy on write storage conservation methods 10 and 100 can be implemented on a variety of devices as, for example, a server computer system, workstation computer system, desktop computer system, laptop computer system, handheld device, etc. Computer readable media for storing information associated with copy on write storage conservation methods 10 and 100 can also be a number of different types of media that can be accessed by computer system and can include, but is not limited to, removable and non removable computer storage media, flash memory, hard disk, optical disk drive, compact disk (CD) etc.). It should further be noted, that the copy on write storage conservation methods 10 and 100 can have some, most, or all of its functionality implemented by a distributed computer system having a large number of dispersed computing nodes, as would be the case where the functionality of the copy on write storage conservation methods 10 and 100 are partly or wholly executed using a cloud computing environment.

Figure 10:
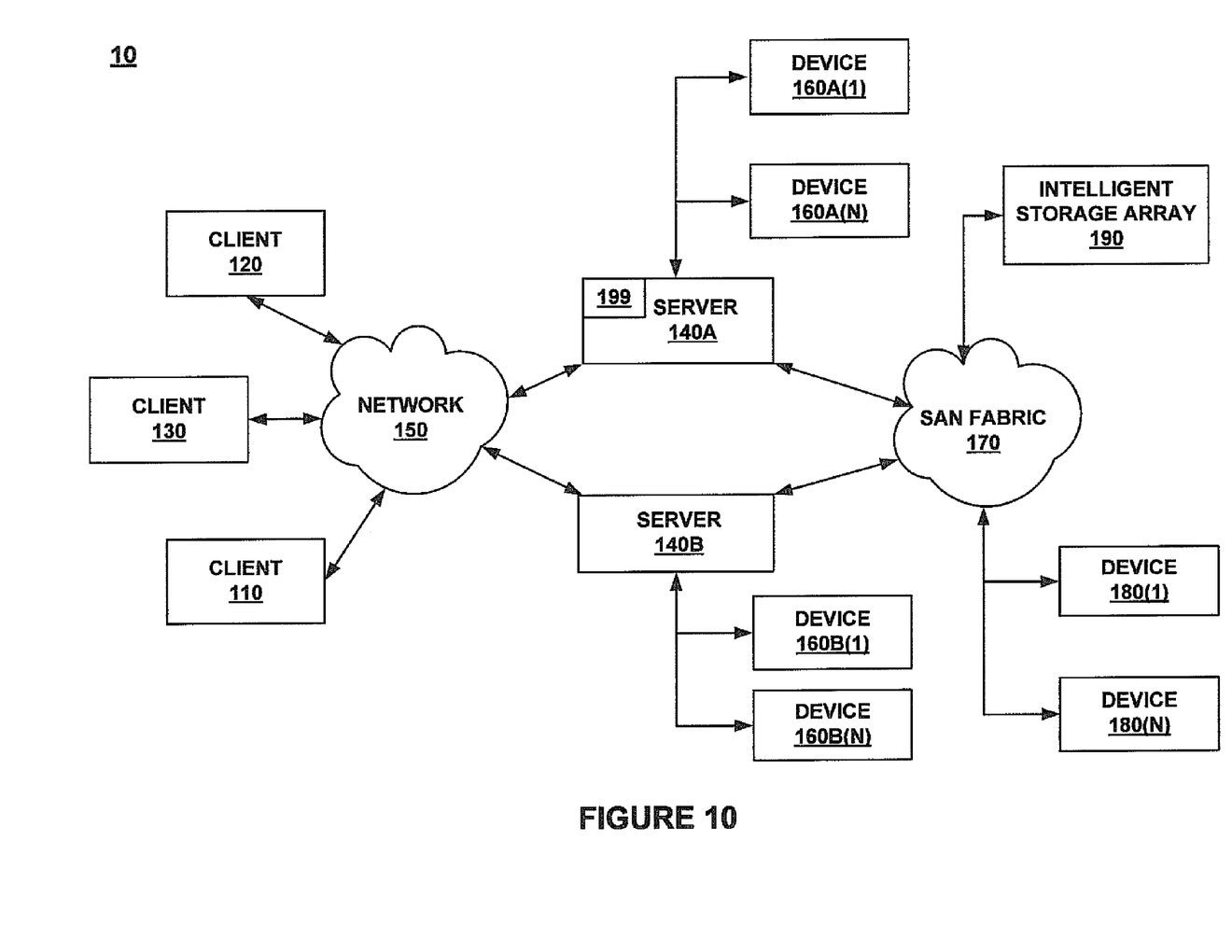
FIG. 10 is a block diagram depicting an exemplary network architecture on which a method can be implemented in accordance with one embodiment of the present invention.

In one embodiment, copy on write storage conservation methods 10 and 100 can be implemented on a network. FIG. 10 is a block diagram depicting a network architecture 1000 in which client systems 110, 120 and 130, as well as storage servers 140A and 140B (any of which can be implemented using computer system 210), are coupled to a network 150. Storage server 140A is further depicted as having storage devices 160A (1)-(N) directly attached, and storage server 140B is depicted with storage devices 160B (1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. Intelligent storage array 190 is also shown as an example of a specific storage device accessible via SAN fabric 170. In one embodiment, server 140A includes copy on write storage conservation module 199. In one embodiment, copy on write storage conservation module 199 is similar to similar to copy on write storage conservation module 801. It is appreciated that present systems and methods are compatible with a variety of implementations. For example, portions of information and instructions associated with can be distributed in various resources.

Figure 11:
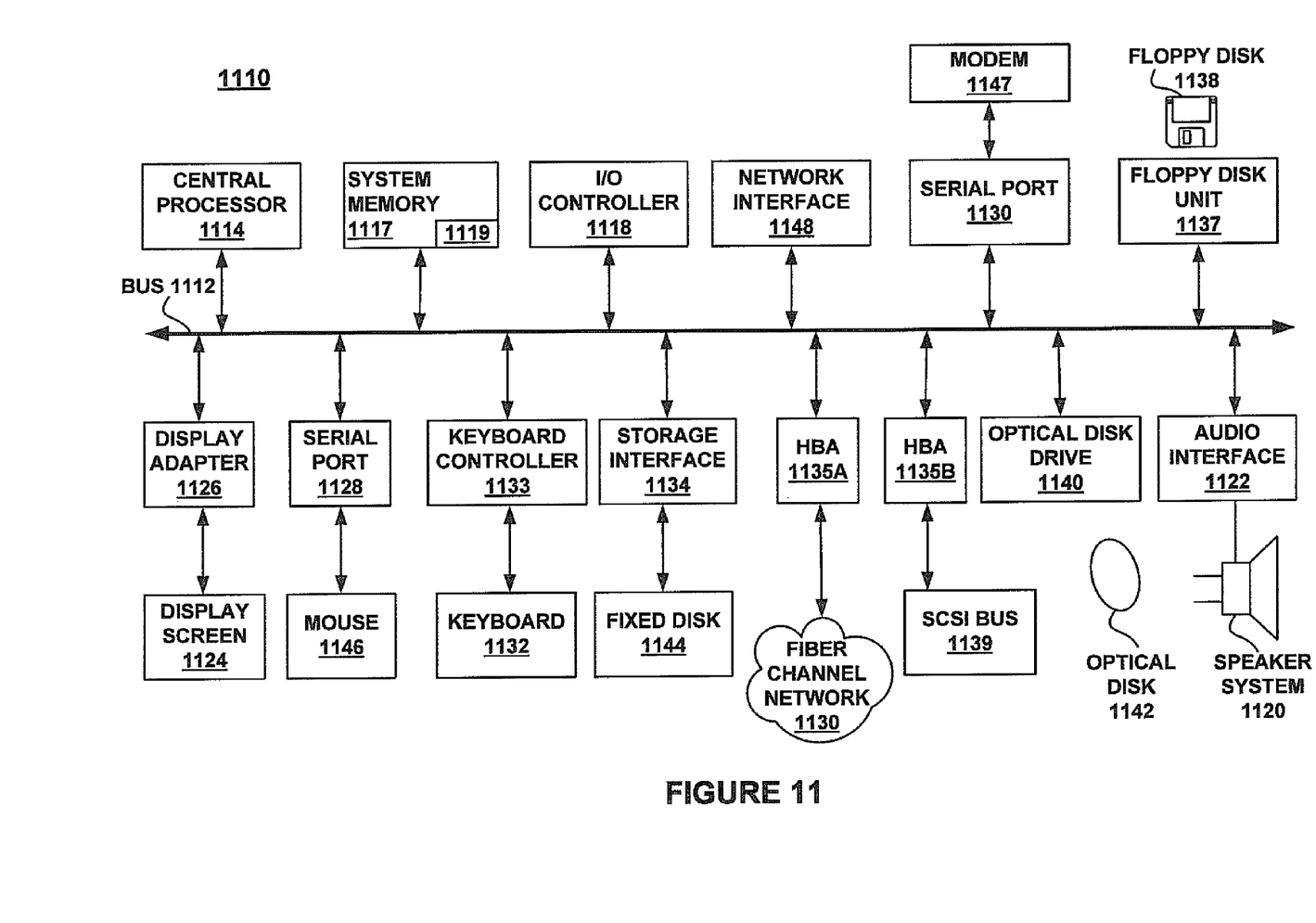
FIG. 11 depicts a block diagram of an exemplary computer system on which a method can be implemented in accordance with one embodiment of the present invention.

FIG. 11 depicts a block diagram of an exemplary computer system 1110 suitable for implementing the present methods. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 242. Also included are a mouse 1146 (or other point-and-click device, coupled to bus 212 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. In one embodiment, instructions for performing a copy on write storage conservation method (e.g., similar to copy on write storage conservation method 1100) are stored in one or more memories of computer system 1100 (e.g., in memory location 1119). The RAM is generally the main memory into which the operating system and application programs are loaded. In one embodiment, RAM 1117 includes backup copy on write storage conservation module 1199. In one embodiment, copy on write storage conservation module 1199 is similar to copy on write storage conservation module 801. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or intelligent storage array 190. FIG. 6 depicts the use of a network such as the Internet for exchanging data, but the present disclosure is not limited to the Internet or any particular network-based environment.

Again it is appreciated that the present copy on write storage conservation approaches can be readily utilized in a variety of implementations. In one embodiment, initiating a copy on write discard process can be done in the context of block-level snapshot drivers using change block bitmap tracking. The systems and methods can include a feature for snapshot drivers to be aware of what blocks are of interest to the applications which are consumers of the snapshot (like backup or replication solutions) and use that knowledge for improving copy-on-write operations. The snapshot driver can maintain a bitmap for the blocks in the volume, and implement an application programming interface (API) that the consumer application can call to set the bits in this bitmap. The consumer uses this API to set a bit whenever the corresponding block is successfully read (backed up/replicated). The snapshot driver, in turn, refers to this bitmap for potential copy-on-writes on a block, and goes ahead if the corresponding bit is not set. If the bit is set, present systems and methods can utilize this as an indication the backup or replication application does not have an interest in the copy on write data anymore and the copy on write data can be deleted. In one embodiment, when the copy on write data is deleted the storage space becomes available or "reclaimed".

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A copy on write storage conservation method comprising:
   creating and mounting a snapshot;
   monitoring interest in the snapshot, including determining that a backup or replication process has read copy on write data and is no longer interested in the copy on write data, wherein the determining is based at least in part on a pattern of reading file data including the copy on write data;
   initiating a copy on write discard process before the backup or replication process is complete; and
   un-mounting and deleting the snapshot when the backup or replication process is complete.

2. The method of claim 1 further comprising marking a file as do not copy on write.

3. The method of claim 1 wherein the copy on write discard process includes discarding copy on write data associated with a block when a corresponding read on the block is successful.

4. The method of claim 1, wherein the copy on write discard process includes a signal to delete copy on write blocks, and wherein the signal is associated with a function of a file indicating reads of information from the file are finished.

5. The method of claim 1 wherein the copy on write discard process includes:
   determining that backup or replication applications read file data in peculiar patterns; and
   deleting copy on write data for a particular file when it is safe in accordance with the peculiar pattern.

6. The method of claim 1 wherein initiating a copy on write discard process is done at a file level, block level and extent level.

7. The method of claim 1 wherein a public application program interface is configured to set the snapshot in an aggressive de-allocation mode initiated before the completion of the backup or replication process.

8. A non-transitory computer readable storage medium having stored thereon computer-executable instructions that, when executed by a computing device, cause the computing device to perform a copy on write storage conservation method comprising:
   creating and mounting a snapshot;
   monitoring interest in the snapshot, including determining that a backup or replication process has read copy on write data and is no longer interested in the copy on write data, wherein the determining is based at least in part on a pattern of reading file data including the copy on write data;
   initiating a copy on write discard process before the backup or replication process is complete; and
   un-mounting and deleting the snapshot when the backup or replication process is complete.

9. The non-transitory computer readable storage medium of claim 8 further comprising marking a file as do not copy on write.

10. The non-transitory computer readable storage medium of claim 8 wherein the copy on write discard process includes discarding copy on write data associated with a block when a corresponding read on the block is successful.

11. The non-transitory computer readable storage medium of claim 8, wherein the copy on write discard process includes a signal to delete copy on write blocks, and wherein the signal is associated with a function of the file indicating reads of information from the file are finished.

12. The non-transitory computer readable storage medium of claim 8 wherein the copy on write discard process includes:
   determining that backup or replication applications read file data in peculiar patterns; and
   discarding the copy on write data for a particular file when it is safe in accordance with the peculiar pattern.

13. The non-transitory computer readable storage medium of claim 8 wherein initiating a copy on write discard process is done at a file level, block level and extent level.

14. The non-transitory computer readable storage medium of claim 8 wherein a public application program interface is configured to set the snapshot in an aggressive de-allocation mode initiated before the completion of the backup or replication process.

15. A system, comprising:
a computer system having a computer processor coupled to non-transitory computer readable storage media and executing computer readable code which causes the computer system to perform a copy on write storage conservation method comprising:
creating and mounting a snapshot;
monitoring interest in the snapshot, including determining that a backup or replication process has read copy on write data and is no longer interested in the copy on write data, wherein the determining is based at least in part on a pattern of reading file data including the copy on write data;
initiating a copy on write discard process before the backup or replication process is complete; and
un-mounting and deleting the snapshot when the backup or replication process is complete.

16. The system of claim 15 further comprising marking a file as do not copy on write.

17. The system of claim 15 wherein the copy on write discard process includes discarding copy on write data associated with a block when a corresponding read on the block is successful.

18. The system of claim 15, wherein the copy on write discard process includes a signal to delete copy on write blocks, and wherein the signal is associated with a function of the file indicating reads of information from the file are finished.

19. The system of claim 15 wherein the copy on write discard process includes:
determining that backup or replication applications read file data in peculiar patterns; and
discarding the copy on write data for a particular file when it is safe in accordance with the peculiar pattern.

20. The system of claim 15 wherein initiating a copy on write discard process is done in at a file level, block level and extent level.

* * * * *